United States Patent
Shimazu

(10) Patent No.: US 9,020,090 B2
(45) Date of Patent: Apr. 28, 2015

(54) AXIAL POWER DISTRIBUTION CONTROL METHOD, AXIAL POWER DISTRIBUTION CONTROL SYSTEM AND AXIAL POWER DISTRIBUTION CONTROL PROGRAM

(75) Inventor: Yoichiro Shimazu, Sapporo (JP)

(73) Assignee: Mitsubishi Heavy Industries, Ltd., Minato-Ku, Tokyo (JP)

(*) Notice: Subject to any disclaimer, the term of this patent is extended or adjusted under 35 U.S.C. 154(b) by 788 days.

(21) Appl. No.: 12/733,273

(22) PCT Filed: Aug. 19, 2008

(86) PCT No.: PCT/JP2008/064716
§ 371 (c)(1),
(2), (4) Date: Mar. 22, 2010

(87) PCT Pub. No.: WO2009/025260
PCT Pub. Date: Feb. 26, 2009

(65) Prior Publication Data
US 2010/0220830 A1    Sep. 2, 2010

(30) Foreign Application Priority Data
Aug. 21, 2007  (JP) .................................. 2007-215022

(51) Int. Cl.
| | | |
|---|---|---|
| *G21C 7/36* | (2006.01) | |
| *G21C 7/08* | (2006.01) | |
| *G21C 17/00* | (2006.01) | |
| *G21D 3/00* | (2006.01) | |
| *G21C 17/108* | (2006.01) | |

(52) U.S. Cl.
CPC ...... *G21C 7/08* (2013.01); *G21C 17/00* (2013.01); *G21C 17/108* (2013.01); *G21D 3/001* (2013.01); *Y02E 30/39* (2013.01)

(58) Field of Classification Search
USPC ......................................................... 376/236
See application file for complete search history.

(56) References Cited

U.S. PATENT DOCUMENTS 4,222,822 A * 9/1980 Mueller et al. ................ 376/217
4,711,753 A * 12/1987 Miller et al. .................. 376/216

FOREIGN PATENT DOCUMENTS

| JP | S61-38595 | 2/1986 |
| JP | H7-104092 | 4/1995 |

(Continued)

OTHER PUBLICATIONS

International Preliminary Report on Patentability, PCT/JP2008/064716, Mar. 9, 2010.*

(Continued)

*Primary Examiner* — Jack W Keith
*Assistant Examiner* — Sharon M Davis
(74) *Attorney, Agent, or Firm* — RatnerPrestia

(57) ABSTRACT

This document's object is to provide an axial power distribution control method in which only the control of an axial power distribution in a nuclear reactor with a simple operation with a clear operational target keeps the control of a xenon oscillation, thereby suppressing the xenon oscillation to an extremely small magnitude in advance at the same time. An axial power distribution control method comprises an axial offset calculation step of calculating an axial offset of the current power distribution ($AO_P$) and axial offsets of the power distributions ($AO_X$, $AO_I$) which would give the current xenon and iodine distributions under equilibrium conditions, respectively, based on relative powers ($P_T$, $P_B$) in the upper and lower halves of the nuclear reactor core, a parameter calculation step of calculating parameters ($DAO_{PX}$, $DAO_{IX}$), a trajectory display step of displaying a trajectory to plot the parameters ($DAO_{PX}$, $DAO_{IX}$) on one and the other axis, respectively, an allowable range excess judgment step of judging if the axial offset of the current power distribution ($AO_P$) exceeds an allowable range, an alarming step of giving the alarm when the $AO_P$ exceeds the allowable range, and a control rod moving step of controlling the movement of control rods to guide the plot to the major axis of an ellipse formed by the trajectory of said parameters upon receipt of the alarm.

7 Claims, 6 Drawing Sheets

(56) References Cited

FOREIGN PATENT DOCUMENTS

| | | |
|---|---|---|
| JP | 07-140290 | 6/1995 |
| JP | 2000-121779 | 4/2000 |
| JP | 3202430 | 6/2001 |

OTHER PUBLICATIONS

Yoichiro Shimazu, "Modification of the Axial Offsets Trajectory Method . . ." Technology Report, 1996, pp. 54-58, vol. 38, No. 1, Journal of the Atomic Energy Society of Japan.

Yoichiro Shimazu et al., "Monitoring and Control of Radial Xenon . . . ", Journal of Nuclear Science and Technology, Feb. 25, 2007, pp. 155-162, vol. 44, No. 2.

Shoichiro Shimada et al., "Load Follow Operation in PWRs", Journal of Thermal and Nuclear Power Engineering Society, Oct. 19, 1979, pp. 135-150, vol. 31, No. 2.

Yoichiro Shimazu et al., "Optical Control of Xenon Oscillation in PWR . . . ", Journal of the Atomic Energy Society of Japan, 1990, pp. 280-285, vol. 33, No. 3.

Supplementary European Search Report for Application No. EP 08 82 8053 dated Aug. 30, 2010.

Corrected Translation of JP 07-104092 published Apr. 21, 1995.

* cited by examiner (a)

(b)

(a)

(b)

AXIAL POWER DISTRIBUTION CONTROL METHOD, AXIAL POWER DISTRIBUTION CONTROL SYSTEM AND AXIAL POWER DISTRIBUTION CONTROL PROGRAM

TECHNICAL FIELD

The present invention is related to a technology for controlling an axial power distribution of a nuclear reactor, and particularly to an axial power distribution control method, an axial power distribution control system and an axial power distribution control program for preventing xenon oscillation generated in a pressurized water reactor in advance.

BACKGROUND ART

It is widely known that a xenon oscillation could occur in the pressurized water reactor (PWR). The xenon oscillation is observed in the form of spatial oscillation of power distributions due to variations in spatial xenon concentration distribution. Xenon is a fission product from nuclear fission and has a high neutron absorption capability.

Xenon oscillation involves significant power distribution distortion in a nuclear reactor and may cause excessive local power, resulting in burnout and failure of a nuclear fuel rod. In case of a loss of coolant accident, the significant power distribution distortion could not ensure the integrity of fuel rods and could cause safety hazards. Consequently, in order to prevent these problems, xenon oscillation must be suppressed within a range of safe plant operation.

One of the technologies for preventing the above-mentioned excessive distortion of power distribution is known as "Power Distribution Control Method" for keeping axial power distribution within a prescribed range. For example, the Constant Axial Offset Control Method controls an axial offset (AO) within an allowable range which is determined based on the target-AO. Where, the AO is defined as a fraction of the power difference in the upper and lower halves of the core, and the target-AO is defined as the AO at which the core power is stable with control rods being almost totally withdrawn. In operation, it is monitored whether AO (or a value calculated by multiplying AO by the relative power when the core is at partial power) is within the allowable range, and if AO is out of the allowable range, the control rods can immediately guide AO back to the allowable range (Patent Document 1, Non-Patent Document 1).

In addition, this inventor also invented a xenon oscillation control method described in Japanese Patent No. 3202430 (Patent Document 2, Non-Patent Document 2, Non-Patent Document 3). The xenon oscillation control method employs an axial offset of the current power distribution ($AO_P$) in a nuclear reactor core, an axial offset of the power distribution which would give the current xenon distribution under equilibrium condition ($AO_X$) and an axial offset of the power distribution which would give the current iodine distribution under equilibrium condition ($AO_I$). Xenon oscillation can be suppressed by inserting or withdrawing control rods, so as to guide a trajectory to plot a parameter $DAO_{PX}$ (=$AO_P-AO_X$) on X axis and a parameter $DAO_{IX}$ (=$AO_I-AO_X$) on Y axis, to the origin of the coordinates.

Patent Document 1: Japanese Patent Application Publication No. 2000-121779
Patent Document 2: Japanese Patent No. 3202430
Non-Patent Document 1: Journal of the Thermal and Nuclear Power Engineering Society, Vol.31 No.2 "Load Follow Operation in PWRs"
Non-Patent Document 2: Journal of the Atomic Energy Society of Japan, Vol. 33, No. 3 "Optimal Control of Xenon Oscillation in PWR Based on Online Data Processing of Axial Offsets"
Non-Patent Document 3: Journal of the Atomic Energy Society of Japan, Vol. 38, No. 1 "Modification of the Axial Offsets Trajectory Method to Control Xenon Oscillation during Load Following Operations"

DISCLOSURE OF THE INVENTION

Problem to be Solved by the Invention

Since the above conventional "Power Distribution Control Method" merely controls AO within an allowable range, this method is capable of preventing significant xenon oscillation, but may not be capable of suppressing xenon oscillation after it occurred. Consequently, additional technical measures must be taken to control xenon oscillation. The control of xenon oscillation exclusively depends on power distribution information, leading to various limited operating conditions, such as changes in allowable range in accordance with power value and making it difficult to efficiently operate a nuclear reactor.

Also, because the invention described in the above Patent Document 1 controls existing xenon oscillation in order to assuredly and efficiently suppress the same, this invention is not appropriate for power distribution control.

In order to solve the above-mentioned problems, it is, therefore, the objective of the present invention to provide an axial power distribution control method, an axial power distribution control system and an axial power distribution control program, with which the control of an axial power distribution, based on easy operation with a clear operational target, can sufficiently control a xenon oscillation, thereby suppressing the xenon oscillation to an extremely small magnitude in advance at the same time.

Means for Solving the Problem

An axial power distribution control method according to the present invention comprises an axial offset calculation step of calculating an axial offset of the current power distribution ($AO_P$), an axial offset of the power distribution which would give the current xenon distribution under equilibrium condition ($AO_X$), and an axial offset of the power distribution which would give the current iodine distribution under equilibrium condition ($AO_I$), using the following expressions (1) to (3), respectively, based on a relative power ($P_T$) in the upper half of the nuclear reactor core and a relative power ($P_B$) in the lower half of the nuclear reactor core, a parameter calculation step of calculating a parameter $DAO_{PX}$ (=$AO_P-AO_X$) and a parameter $DAO_{IX}$ (=$AO_I-AO_X$), a trajectory display step of displaying a trajectory to plot said parameter ($DAO_{PX}$) on one axis and said parameter ($DAO_{IX}$) on the other axis, an allowable range excess judgment step of judging if the axial offset of the current power distribution ($AO_P$) of said nuclear reactor core exceeds an allowable range to ensure the safety of said nuclear reactor core, an alarming step of giving the alarm when the axial offset of the current power distribution ($AO_P$) of said nuclear reactor core exceeds the allowable range, and a control rod moving step of controlling the movement of a control rod to guide a plot point to the major axis of an ellipse formed by the trajectory of said parameters upon receipt of the alarm.

$$AO_P = (P_T - P_B)/(P_T + P_B) \quad \text{Expression (1).}$$

$$AO_X = (P_{TX} - P_{BX})/(P_{TX} + P_{BX}) \quad \text{Expression (2)}$$

$$AO_I = (P_{TI} - P_{BI})/(P_{TI} + P_{BI}) \quad \text{Expression (3)}$$

where $P_{TX}$: relative power in the upper half of the core that would give the current xenon concentration under equilibrium condition $P_{BX}$: relative power in the lower half of the core that would give the current xenon concentration under equilibrium condition $P_{TI}$: relative power in the upper half of the core that would give the current iodine concentration under equilibrium condition $P_{BI}$: relative power in the lower half of the core that would give the current iodine concentration under equilibrium condition An axial power distribution control system and an axial power distribution control program according to the present invention comprise an axial offset calculation unit of calculating an axial offset of the current power distribution ($AO_P$), an axial offset of the power distribution which would give the current xenon distribution under equilibrium condition ($AO_X$), and an axial offset of the power distribution which would give the current iodine distribution under equilibrium condition ($AO_I$), using the following expressions (1) to (3), respectively, based on a relative power ($P_T$) in the upper half of the nuclear reactor core and a relative power ($P_B$) in the lower half of the nuclear reactor core, a parameter calculation unit of calculating a parameter $DAO_{PX}(=AO_P-AO_X)$ and a parameter $DAO_{IX}(=AO_I-AO_X)$, a trajectory display unit of displaying a trajectory to plot said parameter ($DAO_{PX}$) on one axis and said parameter ($DAO_{IX}$) on the other axis, an allowable range excess judgment unit of judging if the axial offset of the current power distribution ($AO_P$) of said nuclear reactor core exceeds an allowable range to ensure the safety of said nuclear reactor core, an alarming unit of giving the alarm when the axial offset of the current power distribution ($AO_P$) of said nuclear reactor core exceeds the allowable range, and a control rod moving unit of controlling the movement of a control rod to guide a plot point to the major axis of an ellipse formed by the trajectory of said parameters upon receipt of the alarm.

$$AO_P = (P_T - P_B)/(P_T + P_B) \quad \text{Expression (1)}$$

$$AO_X = (P_{TX} - P_{BX})/(P_{TX} + P_{BX}) \quad \text{Expression (2)}$$

$$AO_I = (P_{TI} - P_{BI})/(P_{TI} + P_{BI}) \quad \text{Expression (3)}$$

where $P_{TX}$: relative power in the upper half of the core that would give the current xenon concentration under equilibrium condition $P_{BX}$: relative power in the lower half of the core that would give the current xenon concentration under equilibrium condition $P_{TI}$: relative power in the upper half of the core that would give the current iodine concentration under equilibrium condition $P_{BI}$: relative power in the lower half of the core that would give the current iodine concentration under equilibrium condition Effect of the Invention According to the present invention, the control of an axial power distribution in a nuclear reactor can sufficiently control a xenon oscillation, thereby suppressing the xenon oscillation to an extremely small magnitude in advance at the same time.

BEST MODE FOR CARRYING OUT THE INVENTION

An embodiment of an axial power distribution control method, an axial power distribution control system and an axial power distribution control program according to the present invention will be described with reference to the drawings.

FIG. 1 is a block diagram indicating overall structure of an axial power distribution control system 1 including an axial power distribution control program 1a of the present invention and a nuclear reactor 10 controlled by the axial power distribution control system 1.

In this embodiment, the nuclear reactor 10 is a pressurized water reactor (PWR), comprising a pressure vessel 11, a reactor core 12 loaded in the pressure vessel 11, a control rod 13 which controls fission reaction in the reactor core 12, a control rod driving mechanism 14 which drives the control rod 13 vertically, an upper ex-core neutron flux detector 15a and a lower ex-core neutron flux detector 15b located at corresponding upper and lower positions of the reactor core 12, and a nuclear instrumentation system 16 which calculates a relative power of the reactor core 12 based on detection readings on the upper and lower ex-core neutron flux detectors 15a and 15b.

The reactor core 12 contains plural fuel rods as a nuclear fuel therein. The control rod 13 is driven by the control rod driving mechanism 14 which inserts or withdraws the control rod 13 from the reactor core 12. In this embodiment, "axial (ly)" corresponds to an axial direction of the reactor core 12, specifically a longitudinal direction of the fuel rods and a driving direction of the control rod 13. In this embodiment, axial xenon oscillation is described, because it is more commonly observed in an axial direction in the pressurized water reactor 10.

The control rod driving mechanism 14 is driven by the later-mentioned arithmetic processing means 5 to drive the control rod 13 vertically. The ex-core neutron flux detectors 15a and 15b detect neutron fluxes released from upper and lower halves of the reactor core 12 to ex-core, respectively. The nuclear instrumentation system 16 calculates a relative power ($P_T$) of the upper half of the reactor core and a relative power ($P_B$) of the lower half of the reactor core, based on detection values on ex-core neutron flux detectors 15a and 15b. In this embodiment, a relative power is a value given by normalizing a rated power of the nuclear reactor 10 to 1.0.

The axial power distribution control system 1 of this embodiment, as shown in FIG. 1, mainly comprises a displaying means 2 composed of a liquid crystal display, an input means 3 composed of a keyboard, a mouse, etc., a storage means 4 which stores an axial power distribution control program 1a of this embodiment and other data and an arithmetic processing means 5 which controls the constitutive means, acquires other data and performs arithmetic processing.

The storage means 4, comprising a hard disk and a random access memory (RAM), as shown in FIG. 1, further comprises a program storage unit 41 and a power change allowable value memory unit 42.

Each component of the storage means 4 will be described in more detail. The program storage unit 41 is provided with the axial power distribution control program 1a of this embodiment installed therein, which is executed by the arithmetic processing means 5 to realize an axial power distribution control method of this embodiment.

The power change allowable value memory unit 42 stores an allowable range with regard to the axial offset of the current power distribution in the reactor core 12 of the nuclear reactor 10 (hereinafter briefly called "$AO_P$"). The allowable range is determined according to characteristics of the reactor core 12 in accordance with safety analysis of the reactor core 12 to reduce negative effects of xenon oscillation introduced as an axial power of the reactor core 12 changes and to ensure the safety of the reactor core 12.

Next, the arithmetic processing means 5 comprises central processing unit (CPU), and by executing the axial power distribution control program 1a installed in the program storage unit 41, and a computer functions by the program, comprising a relative power acquisition unit 51, an axial offset calculation unit 52, a parameter calculation unit 53, a trajectory display unit 54, an allowable range excess judgment unit 55, an alarming unit 56, and a control rod moving unit 57 as shown in FIG. 1.

Each component of the arithmetic processing means 5 will be described in more detail.

The relative power acquisition unit 51 acquires relative powers $P_T$ and $P_B$ in upper and lower regions of the reactor core 12. In this embodiment, the relative power acquisition unit 51 acquires relative powers $P_T$ and $P_B$ from the nuclear instrumentation system 16 at a specified time interval to provide them to the axial offset calculation unit 52.

The axial offset calculation unit 52 calculates the above-mentioned $AO_P$, an axial offset of the power distribution which would give the current xenon distribution under equilibrium condition (hereinafter briefly called $AO_X$), and an axial offset of the power distribution which would give the current iodine distribution under equilibrium condition (hereinafter briefly called $AO_I$).

In this embodiment, the axial offset calculation unit 52 acquires relative powers $P_T$ and $P_B$ from the relative power acquisition unit 51 to calculate axial offsets of the current power distributions, $AO_P$, $AO_X$ and $AO_I$ by the following Expressions (1) to (3), respectively.

$$AO_P = (P_T - P_B)/(P_T + P_B) \quad \text{Expression (1)}$$

$$AO_X = (P_{TX} - P_{BX})/(P_{TX} + P_{BX}) \quad \text{Expression (2)}$$

$$AP_I = (P_{TI} - P_{BI})/(P_{TI} + P_{BI}) \quad \text{Expression (3)}$$

where $P_{TX}$: relative power in the upper half of the core that would give the current xenon concentration under equilibrium condition $P_{BX}$: relative power in the lower half of the core that would give the current xenon concentration under equilibrium condition $P_{TI}$: relative power in the upper half of the core that would give the current iodine concentration under equilibrium condition $P_{BI}$: relative power in the lower half of the core that would give the current iodine concentration under equilibrium condition Here, methods for calculating $AO_X$ and $AO_I$ will be described in more detail. Changes in average xenon concentrations $X_T$ and $X_B$ in the upper half of the reactor core and the lower half of the reactor core are calculated according to the following Expressions (4) and (5), respectively.

$$dX_T/dt = y_X \Sigma_f \phi_0 P_T + \lambda_I I_T - (\sigma_a \phi_0 P_T + \lambda_X) X_T \quad \text{Expression (4)}$$

$$dX_B/dt = y_X \Sigma_f \phi_0 P_B + \lambda_I I_B - (\sigma_a \phi_0 P_B + \lambda_X) X_B \quad \text{Expression (5)}$$

Changes in average iodine concentrations $I_T$ and $I_B$ in the upper half of the reactor core and the lower half of the reactor core are calculated according to the following Expressions (6) and (7), respectively.

$$dI_T/dt = y_I \Sigma_f \phi_0 P_T - \lambda_I I_T \quad \text{Expression (6)}$$

$$dI_B/dt = y_I \Sigma_f \phi_0 P_B - \lambda_I I_B \quad \text{Expression (7)}$$

where $y_X$, $y_I$: xenon and iodine yields from nuclear fission $\lambda_X$, $\lambda_I$: decay constant of xenon and iodine $\Sigma_f$: macroscopic nuclear fission cross section $\sigma_a$: microscopic absorption cross section of xenon $\phi_0$: mean neutron flux with rated power Average xenon concentrations $X_T$ and $X_B$, and average iodine concentrations $I_T$ and $I_B$ in the upper half of the reactor core and the lower half of the reactor core are calculated by integrating the above Expressions (4) to (7). Meanwhile, xenon concentrations $X_T^{Eq}$ and $X_B^{Eq}$ under equilibrium condition are calculated using relative powers $P_T^{Eq}$ and $P_B^{Eq}$ under equilibrium condition in the upper and lower halves of the reactor core using the following Expressions (8) and (9).

$$X_T^{Eq} = (y_I + y_X)\Sigma_f \phi_0 P_T^{Eq}/(\sigma_a \phi_0 P_T^{Eq} + \lambda_X) \quad \text{Expression (8)}$$

$$X_B^{Eq} = (y_I + y_X)\Sigma_f \phi_0 P_B^{Eq}/(\sigma_a \phi_0 P_B^{Eq} + \lambda_X) \quad \text{Expression (9)}$$

Iodine concentrations $I_T^{Eq}$ and $I_B^{Eq}$ under equilibrium condition in the upper and lower halves of the reactor core are calculated using relative powers $P_T^{Eq}$ and $P_B^{Eq}$ under equilibrium condition in the upper and lower halves of the reactor core using the following Expressions (10) and (11).

$$I_T^{Eq} = y_I \Sigma_f \phi_0 P_T^{Eq}/\lambda_I \quad \text{Expression (10)}$$

$$I_B^{Eq} = y_I \Sigma_f \phi_0 P_B^{Eq}/\lambda_I \quad \text{Expression (11)}$$

While xenon concentrations $X_T$ and $X_B$ in the upper and lower halves of the reactor core are given by the above Expressions (8) and (9), their corresponding power levels $P_{TX}$ and $P_{BX}$ are calculated. Consequently, $AO_X$ can be determined by the following Expression (12).

$$AO_X = (P_{TX} - P_{BX})/(P_{TX} + P_{BX}) \quad \text{Expression (12)}$$
$$= (y_I + y_X)\Sigma_f(X_T - X_B)/$$
$$\{(y_I + y_X)\Sigma_f(X_T + X_B) - 2\sigma_a X_T X_B\}$$

Likewise, $AO_I$ can be calculated by the following Expression (13).

$$AO_I = (P_{TI} - P_{BI})/(P_{TI} + P_{BI}) \quad \text{Expression (13)}$$
$$= (I_T - I_B)/(I_T + I_B)$$

The parameter calculation unit 53 calculates a parameter $DAO_{PX}$ and a parameter $DAO_{IX}$. Specifically, the parameter calculation unit 53 acquires $AO_P$, $AO_X$ and $AO_I$ from the axial offset calculation unit 52 to calculate a parameter $DAO_{PX}$ ($=AO_P-AO_X$) and a parameter $DAO_{IX}$ ($=AO_I-AO_X$).

The trajectory display unit 54 displays a plot trajectory of parameters ($DAO_{PX}$, $DAO_{LX}$). Specifically, the trajectory display unit 54 acquires the parameters ($DAO_{PX}$, $DAO_{LX}$) calculated by the parameter calculation unit 53 to indicate a plot trajectory of a parameter ($DAO_{PX}$) on X axis and a parameter ($DAO_{LX}$) on Y axis on the displaying means 2. A method for indicating a plot trajectory is not limited thereto, but may be a method for indicating a plot trajectory of a parameter ($DAO_{PX}$) on Y axis and a parameter ($DAO_{LX}$) on X axis in orthogonal coordinate system.

It is known that a plot trajectory of parameters ($DAO_{PX}$, $DAO_{LX}$) involves the characteristics in the following (1) to (5).

(1) In a case where xenon oscillation is stable, a trajectory is expressed by a flat ellipse centering on the origin, as shown in FIG. 2 (*a*). The major axis of the ellipse, which lies in the first and third quadrants, inclines at a fixed angle (approximately 36 degrees) to a horizontal axis independent from the amplitude of a xenon oscillation.

(2) In the trajectory, the plot point always moves counter-clockwise and around the origin with one-cycle of xenon oscillation (about 30 hours). Specifically, the larger the distance of the plot point is from the major axis of the ellipse, the higher the speed of progress on ellipse becomes.

(3) In a case where xenon oscillation is divergent, an elliptic spiral becomes larger as shown in FIG. 2 (*b*), and if xenon oscillation is convergent, an elliptic spiral becomes smaller and converges on the origin.

(4) When the control rod 13 is inserted into the reactor core 12 stepwise, the trajectory moves to the negative side in parallel with the horizontal axis, and when the control rod 13 is withdrawn, the trajectory moves to the positive side in parallel with the horizontal axis. After the control rod 13 stops, the trajectory will be formed as another ellipse having characteristics of the above (1) to (3).

(5) When the trajectory stays at the origin (under the condition of $AO_P=AO_X=AO_I$), the xenon oscillation is suppressed.

The allowable range excess judgment unit 55 judges if $AO_P$ exceeds the above-mentioned allowable range. Specifically, the allowable range excess judgment unit 55 acquires $AO_P$ calculated by the axial offset calculation unit 52 and judges if the $AO_P$ is within the allowable range by comparing it with the allowable range stored in the power change allowable value memory unit 42. In a case where $AO_P$ exceeds the allowable range, a signal is given to an alarming unit 56.

The alarming unit 56 gives the alarm when $AO_P$ exceeds the allowable range. In this embodiment, the alarming unit 56 changes a color of the plot point indicated by the trajectory display unit 54 when a power signal is acquired from the allowable range excess judgment unit 55. For example, when the plot point is normally indicated in blue with $AO_P$ lying within the allowable range, the alarming unit 56 indicates the point in vivid colors such as red to give the operator the alarm.

A method for giving the alarm by the alarming unit 56 is not limited to the above-mentioned embodiment, but may be, e.g., an embodiment in which the displaying means 2 indicates an alarm message or another embodiment in which a sound power means (not shown) gives an alarm. These embodiments correspond to manual operation of the control rod 13, but in case of automatic control of the control rod 13, an alarm signal is directly given to the control rod moving unit 57.

The control rod moving unit 57 controls the control rod driving mechanism 14 and control the movement of the control rod 13. In this embodiment, in a case where the alarming unit 56 gives an alarm, the operator makes the control rod 13 move via the input means 3. Specifically, the control rod moving unit 57 acquires operational information (direction and amount of movement) inputted from the input means 3 and gives a drive signal corresponding to the operation to the control rod driving mechanism 14.

In this embodiment, the control rod 13 may be moved so that a plot point of the ellipse trajectory indicated on the displaying means 2 is guided to the major axis of the ellipse. In fact, this method for operating a control rod is invented by this inventor based on unconventional findings. This inventor found that $AO_P$ is constant in case of a plot point lying on the major axis of the ellipse trajectory.

The above findings will be described in more detail with reference to the drawings. FIG. 3 (*a*) is a graph showing $AO_P$ of the reactor core 12 when xenon oscillation is induced by inserting the control rod 13 into the reactor core 12 (origin to point A), maintaining the state for a certain period of time (points A to B) and withdrawing the control rod 13 (points B to C) to give disturbance. FIG. 3 (*b*) is a graph showing a plot trajectory of parameters ($DAO_{PX}$, $DAO_{LX}$) corresponding to FIG. 3 (*a*).

As shown in FIG. 3 (*a*), when $AO_P$ oscillates with a predetermined cycle which can produce xenon oscillation, its rate of change or tangential inclination is 0 at poles (D, E, F). Meanwhile, these poles (D, E, F) lie on the major axis of an ellipse formed by the trajectory of said parameters in FIG. 3 (*b*). In a case where a plot point lies on the major axis of an ellipse formed by the trajectory of said parameters, $AO_P$ is constant. When a plot point deviates from the major axis, $AO_P$ can constantly change, indicating a growing xenon oscillation.

The parameter $DAO_{PX}$ is defined as ($AO_P-AO_X$), and the major axis and minor axis of an ellipse formed by the trajectory of said parameters is proportional to $AO_P$ (expressed as amplitude in FIG. 3 (*a*)). Consequently, from the above characteristic (4), the major axis of the ellipse trajectory is shortened to reduce the $AO_P$, only by guiding a plot point to the major axis of an ellipse formed by the trajectory of said parameters. Soon after the trajectory progresses, an ellipse formed by the trajectory of said parameters is drawn with reduced major axis and minor axis, thereby suppressing xenon oscillation.

In a case where the control rod 13 is moved, a plot point is preferably moved to the major axis, but may be as close as possible. As a result, since the rate of change in $AO_P$ becomes a minimum level, xenon oscillation can be prevented in advance. As long as no other disturbance is observed, xenon oscillation develops with smaller amplitude after the plot point is moved, thereby making the plot point gradually approach the origin and inevitably suppressing xenon oscillation.

In this embodiment, the control rod 13 is manually operated by an operator, but this invention is not limited thereto. The control rod moving unit 57 may automatically control the control rod 13. In this case, the control rod moving unit 57 acquires an alarm signal from the alarming unit 56 to calculate a distance on X axis from the current plot point to the major axis of the ellipse trajectory. Based on the distance, a movement volume of the control rod 13 is calculated and an operation signal of inserting the control rod 13 by the steps is given to the control rod driving mechanism 14. Since the relationship between motion steps of the control rod 13 and motion steps of a plot point varies with time, arithmetic processing is executed in accordance with conditions corresponding thereto.

Next, operation of the axial power distribution control system 1 executed by the axial power distribution control program 1a of this embodiment and the axial power distribution control method will be described with reference to FIG. 4.

First of all, in a case where the axial power distribution control system 1 of this embodiment controls a pressurized water reactor, the relative power acquisition unit 51 acquires a relative power ($P_T$) of the upper half of the reactor core and a relative power ($P_B$) of the lower half of the reactor core from a nuclear instrumentation system 16 (step S1).

Subsequently, the axial offset calculation unit 52 calculates $AO_P$, $AO_X$ and $AO_I$, using the above Expressions (1) to (3), respectively, based on $P_T$ and $P_B$ acquired by the relative power acquisition unit 51 (step S2). The parameter calculation unit 53 calculates a parameter $DAO_{PX}$ and a parameter, $DAO_{IX}$ (step S3).

Each time $AO_P$ is calculated, the allowable range excess judgment unit 55 compared the $AO_P$ at a point of time with the allowable range stored in the power change allowable value memory unit 42 and judges if an $AO_P$ at the point of time is within the allowable range (step S4). As a result, if $AO_P$ is within the allowable range (step S4: NO), the trajectory display unit 54 indicates a plot point showing a parameter ($DAO_{PX}$, $DAO_{IX}$) on the displaying means 2 (step S5) and returns to step S1. By this process, a plot trajectory with a predetermined time interval is displayed on a displaying means 2.

Meanwhile, after the allowable range excess judgment unit 55 makes a judgment, if $AO_P$ exceeds the allowable range (step S4: YES), the alarming unit 56 indicates a plot point in a different color to give the alarm (step S6). Thereafter, an operator can readily view that $AO_P$ has exceeded the allowable range or the reactor core 12 has been out of the allowable range to assuredly confirm an operational timing of the control rod 13.

After receiving an alarm from the alarming unit 56, an operator operates the control rod 13 from the input means 3 (step S7). In this embodiment, the operator operates the control rod 13 so as to guide a plot point indicated in a different color to the major axis of the ellipse trajectory. Consequently, as long as no other disturbance is observed, xenon oscillation can be prevented in advance due to a minimum rate of $AO_P$ change. As xenon oscillation changes with smaller amplitude, a plot point approaches the origin to inevitably suppress xenon oscillation, without particular control. After the movement of the control rod 13 is controlled, the process returns to step S1 and afterward processes from step S1 through step S7 are continuously and repeatedly performed.

The above-mentioned embodiment includes the following advantages:
1. Control of an axial power distribution in a nuclear reactor 10 can sufficiently control a xenon oscillation, thereby suppressing the xenon oscillation to an extremely small magnitude in advance to ensure the safety of control of a nuclear reactor at the same time.
2. Movement timing and movement distance of the control rod 13 can be readily viewed to easily and assuredly operate the control rod 13 and plan clear-cut reactor control strategy.

EXAMPLE 1

In this Example 1, a numerical simulation experiment for controlling axial power distribution was performed by simulating daily load following operation in a pressurized water reactor with an axial power distribution control system 1 according to the present invention. The load ranged from a rated power to a half in an hour, and was maintained under this condition for 8 hours. Afterward, the level was returned to the rated power 1 hour later and it was maintained for 14 hours. This cycle was repeated.

In this Example 1, an operator monitored a plot trajectory indicated on a displaying means 2, and performed an extremely simple control by guiding the plot point to the target major axis when the color of the plot point became different. FIG. 5 shows power patterns and movement history of a control rod 13 on the 2nd day in the experiment, and FIG. 6 shows history of changes in $AO_P$ at the same time.

As shown in FIG. 5, the movement of the control rod 13 is extremely simply and swiftly performed. However, FIG. 6 indicates that changes in $AO_P$ are significantly reduced, other than a case where power is changed. In conventional power distribution control, "$AO_P$ multiplied by relative power" value is controlled within ±5% width from the target, but in this Example 1, an $AO_P$ allowable range was set at a large value of ±9%. Despite this setting, no xenon oscillation was generated. Also, with a constant power, xenon oscillation was not generated or constantly converged. This unconventionally stable control can solve various conventional technical problems.

FIG. 7 shows a plot trajectory ($DAO_{PX}$, $DAO_{IX}$) on the 2nd day in the experiment. These data were obtained by calculating every 6 minutes, using a simple analysis model. In FIG. 7, insertion of the control rod 13 is denoted as a double circle (⊚), and withdrawing of the control rod 13 is denoted as a circle (○). It is indicated that a plot point eventually changes into an extremely small ellipse trajectory, showing technical validity of this invention.

On the other hand, FIG. 8 shows a plot point of "$AO_P$ multiplied by relative power" used in conventional control on the 2nd day in the experiment as Comparative Example. As in FIG. 7, insertion of the control rod 13 is denoted as a double circle (⊚) and withdrawing of the control rod 13 is denoted as a circle (○). As shown in FIG. 8, as conventional plot points demonstrate no favorable control guidelines, the present invention provides a favorable method for controlling the control rod.

As shown in this Example 1, in a case where load following operation changes power, a control method of this embodiment must be modified. Consequently, the calculation of $AO_X$ needs special consideration.

First of all, because the above Expressions (4) and (5) include terms of products of powers $P_T$ and $P_B$ and xenon concentrations $X_T$ and $X_B$, a change in xenon concentration is nonlinear to the power of each region of a reactor core 12. Therefore, as shown in an expression of xenon concentration under equilibrium condition and power (the above Expressions (8) and (9)), xenon concentration under equilibrium condition is asymptotic to $(y_I+y_X)\Sigma_f/\sigma_a$ as a power increases.

If xenon concentration approaches the asymptotic value, a power obtained by inverse calculation from this value can be infinite value. For instance, such xenon concentration can be found when the power is reduced from a rated power to a partial power. Specifically, $AO_X$ obtained using the above Expression (12) can be significantly large and can significantly deviate from a value obtained under actual operating conditions. The trajectory would be divergent in this case.

The above problem can be solved by defining $AO_X$ as an axial offset of the axial power distribution which would give the current xenon offset ($X_r$) under equilibrium condition at the operating core power.

Xenon offset $X_r$ is defined by the following expression.

$$X_r = (X_T - X_B)/(X_T + X_B) \quad \text{Expression (14)}$$

By substituting the above Expressions (8) and (9) for the above Expression (14), $$X_r = \lambda_X(P_T-P_B)/\{\lambda_X(P_T+P_B)+2\sigma_a\phi_0 P_T P_B\} \quad \text{Expression (15)}$$

By definition, $P_T$ and $P_B$ are expressed by the following expressions.

$$P_T = P(1+AO_X) \quad \text{Expression (16)}$$

$$P_B = P(1-AO_X) \quad \text{Expression (17)}$$

Here, P is the operating power which is obtained as measured value. By the above-mentioned definition, P is calculated from $P_{TX}$ and $P_{BX}$ obtained by inverse operation from xenon concentration, resulting in a difference from actual power.

By substituting the above Expressions (16) and (17) for the above Expression (15) to solve $AO_X$, the $AO_X$ is determined by the following Expression (18).

$$AO_X = \{-1+\sqrt{(1-b\ 4AC)}\}/2A \quad \text{Expression (18)}$$

where
$A = \sigma_a\phi_0 P X_r/\lambda_X$
$C = -X_r - A$

Using the above Expression (18), a control method of this embodiment can be applied under any operational conditions.

According to the above-mentioned Example 1, xenon oscillation can be prevented even with reduction in power of a pressurized water reactor by load following operation.

An axial power distribution control method, an axial power distribution control system 1 and an axial power distribution control program 1a according to the present invention are not limited to the above-mentioned embodiments, but may be altered accordingly.

EXPLANATION OF LETTERS OR NUMERALS

Figure 1:
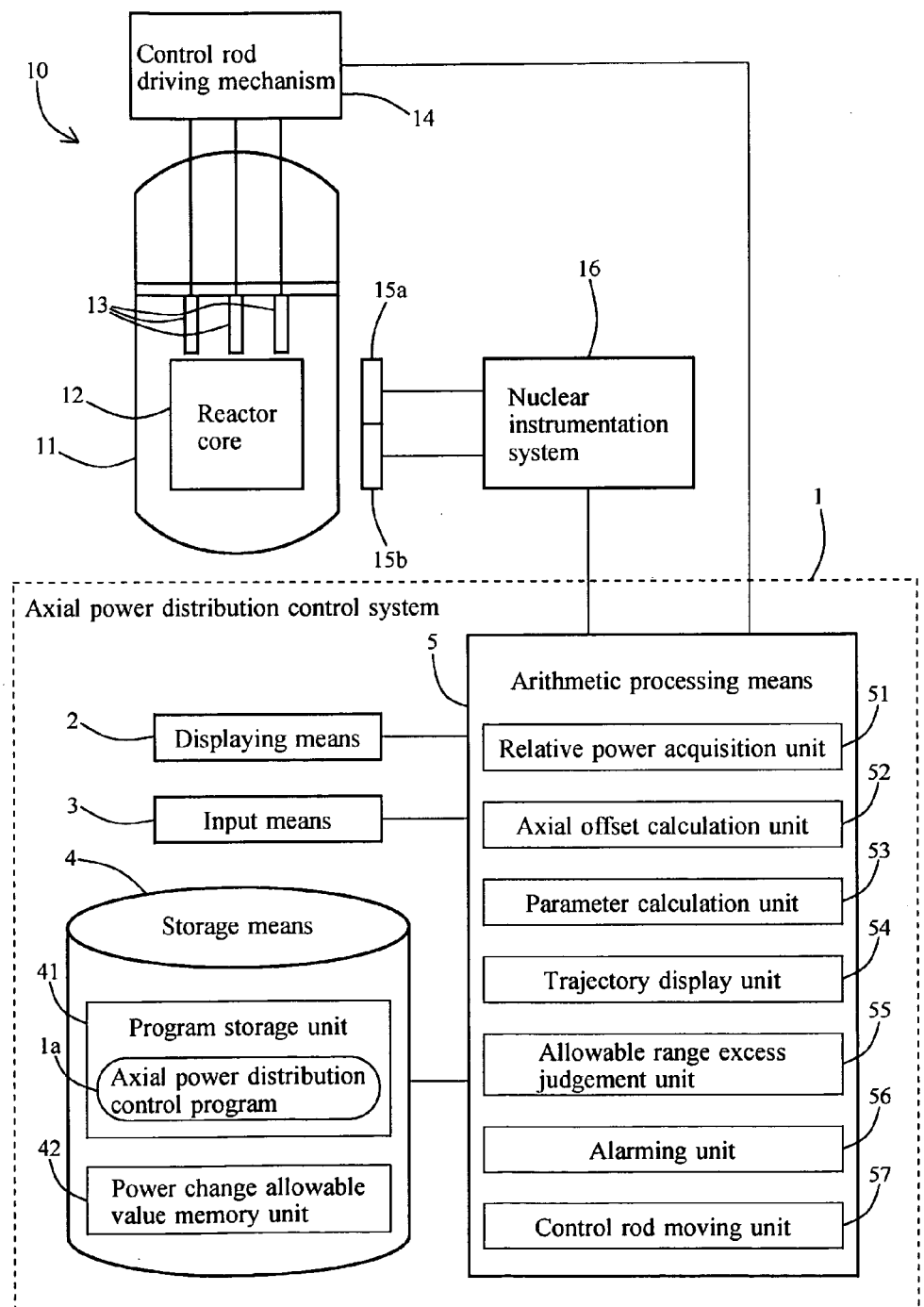
FIG. 1 is a block diagram showing overall structure of an axial power distribution control system and a nuclear reactor according to the present invention.
Figure 2:
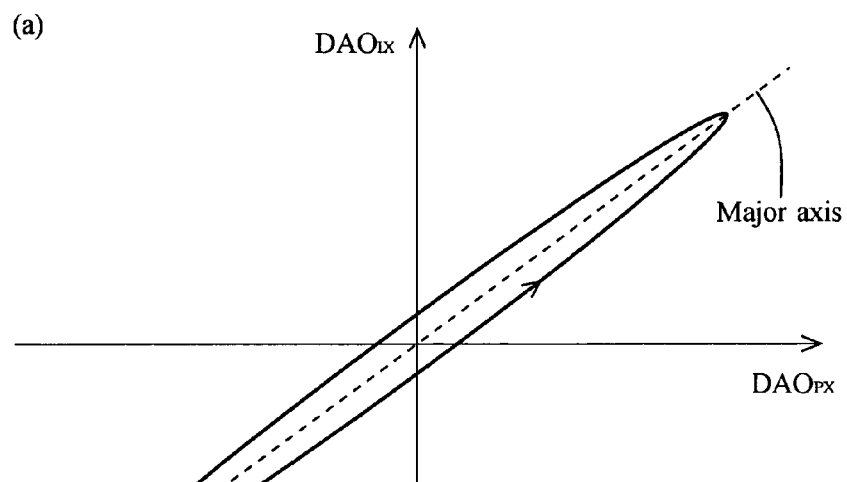
FIG. 2(a) is a diagram showing a plot trajectory when xenon oscillation is stable in this embodiment.
FIG. 2(b) is a diagram showing a plot trajectory when xenon oscillation is divergent in this embodiment.
Figure 2:
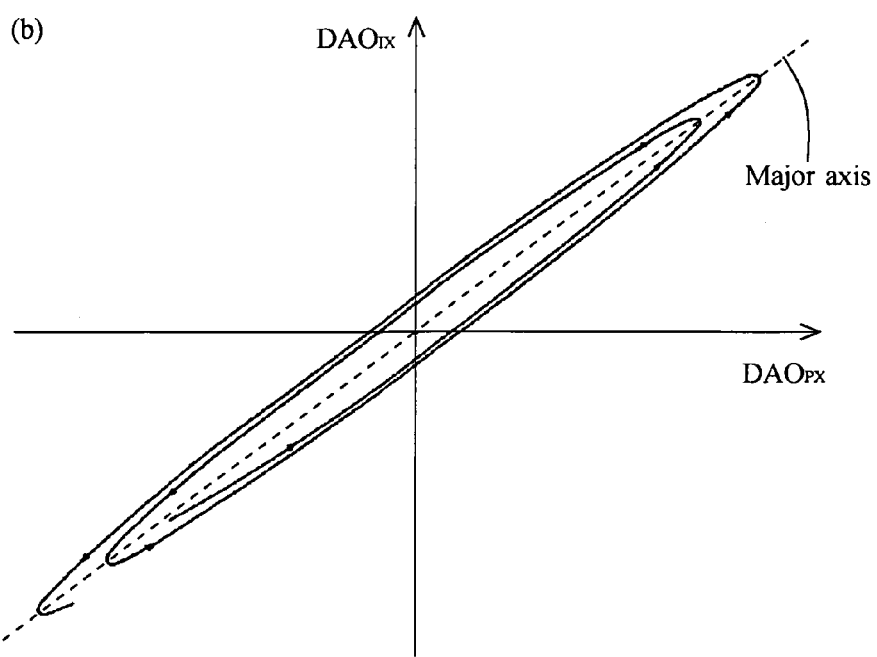
Figure 3:
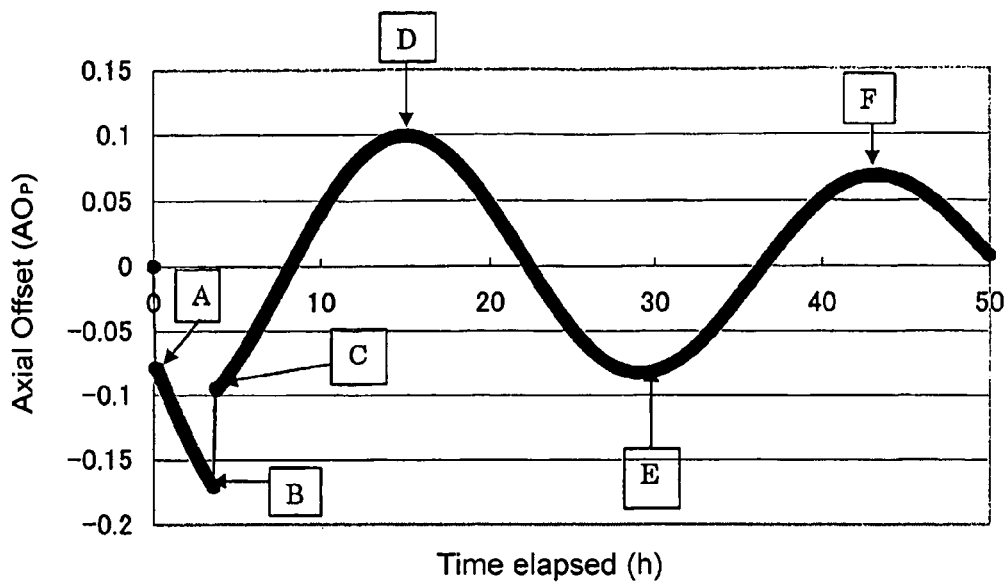
FIG. 3(a) is a diagram showing $AO_P$ during xenon oscillation in this embodiment.
FIG. 3(b) is a diagram showing a plot trajectory ($DAO_{PX}$, $DAO_{IX}$) corresponding to FIG. 3(a)
Figure 3:
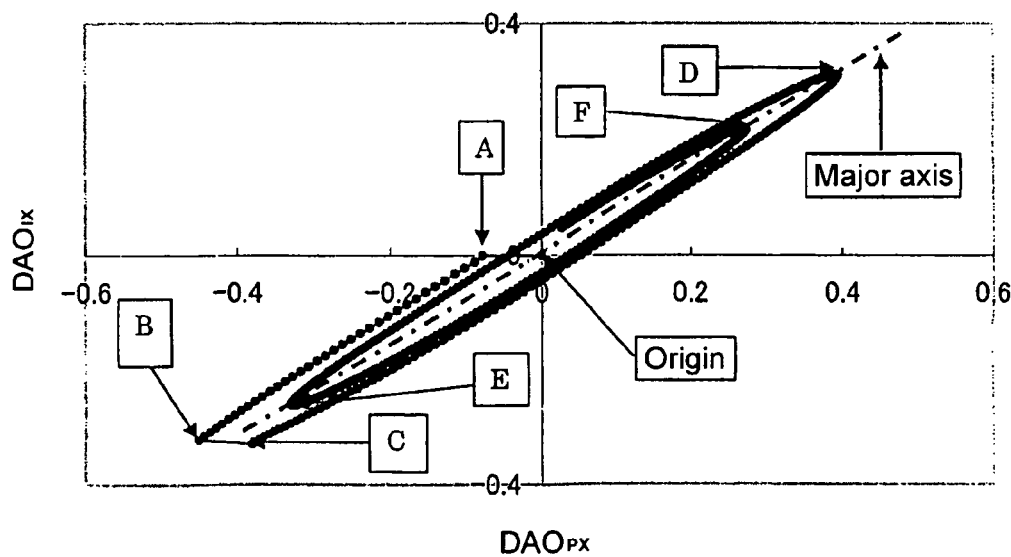
Figure 4:
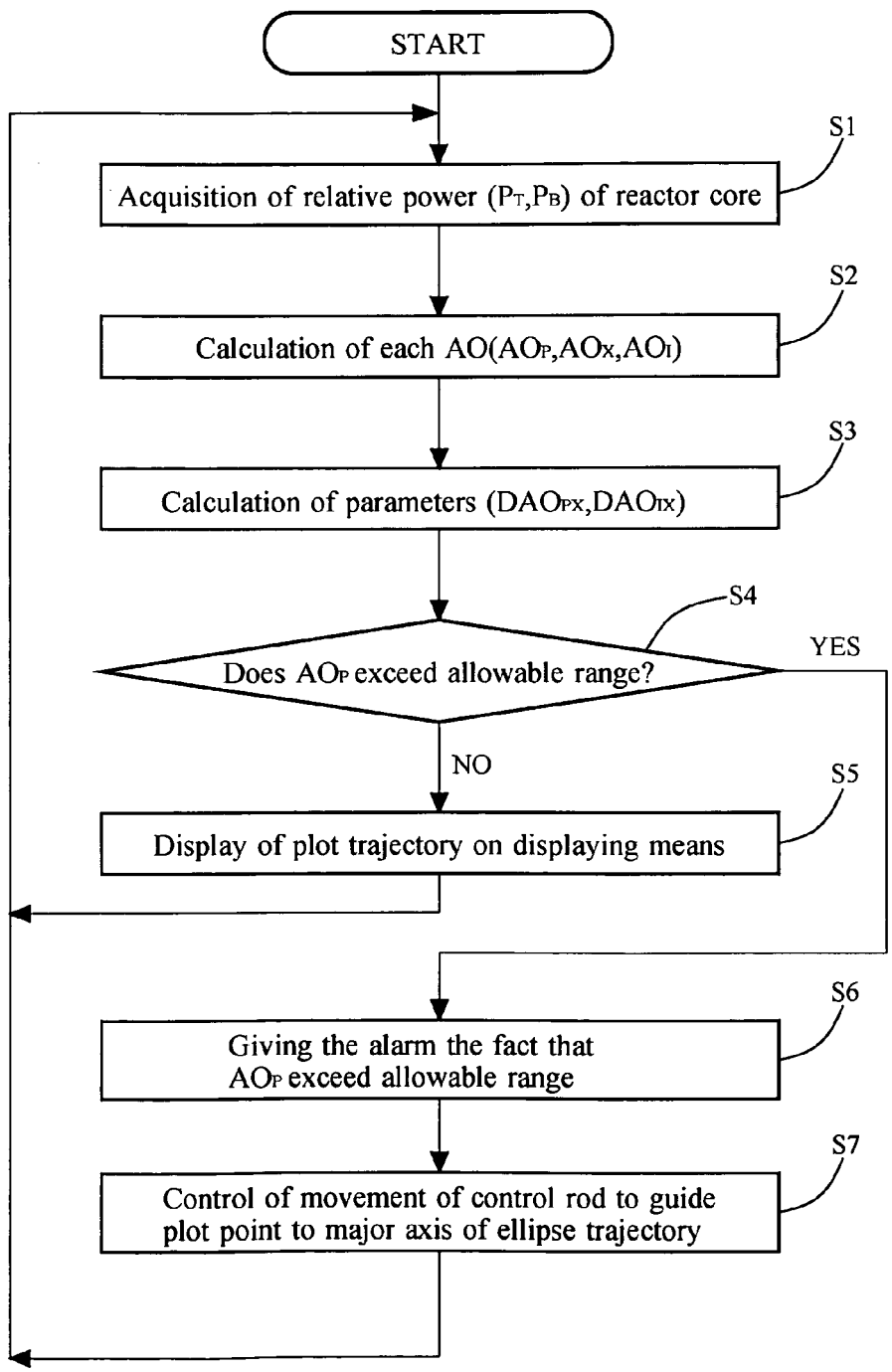
FIG. 4 is a flowchart showing an axial power distribution control method of this embodiment.
Figure 5:
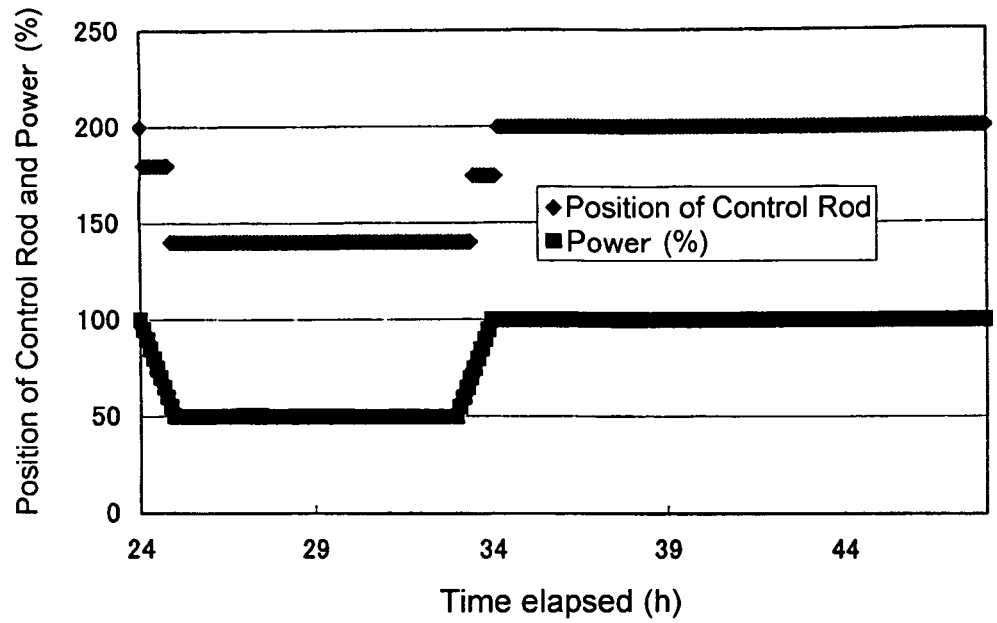
FIG. 5 is a graph showing a relationship between movement history of control rod/power and time elapsed in this Example 1.
Figure 6:
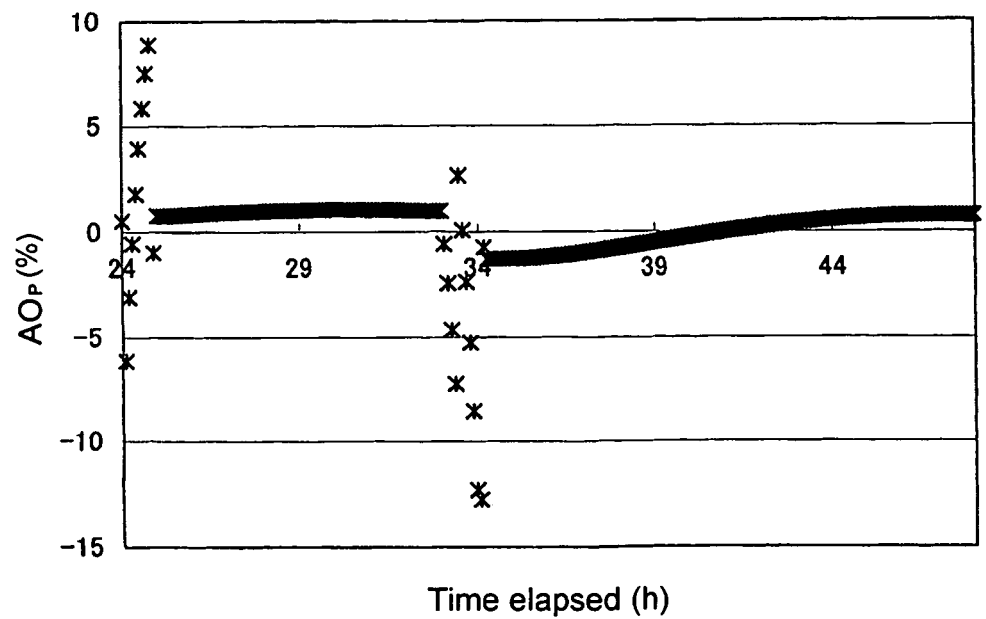
FIG. 6 is a graph showing a relationship between history of changes in $AO_P$ and time elapsed corresponding to FIG. 5 in this Example 1.
Figure 7:
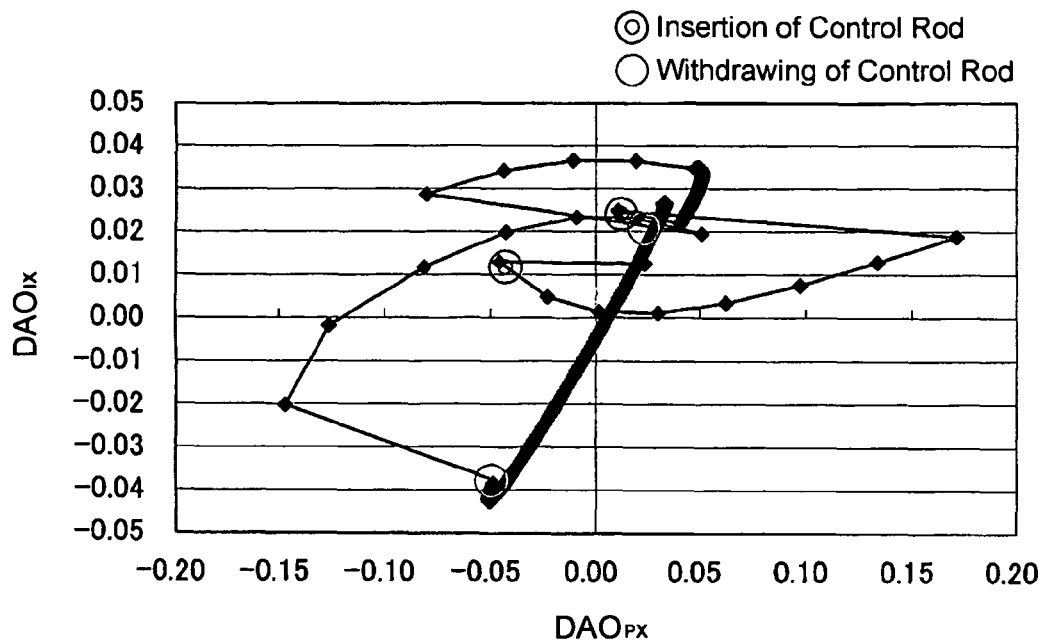
FIG. 7 is a graph showing a plot trajectory ($DAO_{PX}$, $DAO_{IX}$) in this Example 1.
Figure 8:
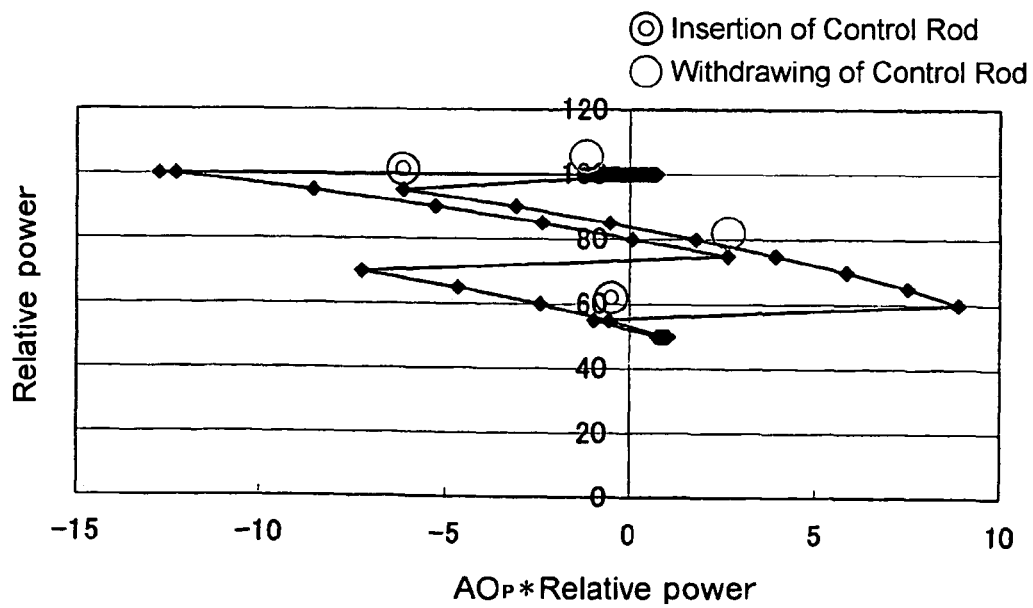
FIG. 8 is a graph showing a relationship between "$AO_P$ multiplied by relative power" and relative power in Comparative Example.

1 Axial power distribution control system
1a Axial power distribution control program
2 Displaying means
3 Input means
4 Storage means
5 Arithmetic processing means
10 Nuclear reactor
11 Pressure vessel
12 Reactor core
13 Control rod
14 Control rod driving mechanism
15a Upper ex-core neutron flux detector
15b Lower ex-core neutron flux detector
16 Nuclear instrumentation system
41 Program storage unit
42 Power change allowable value memory unit
51 Relative power acquisition unit
52 Axial offset calculation unit
53 Parameter calculation unit
54 Trajectory display unit
55 Allowable range excess judgment unit
56 Alarming unit
57 Control rod moving unit

The invention claimed is:

1. A method for controlling an axial power distribution in a nuclear reactor having a core and a control rod, comprising:
   (a) calculating an axial offset of a current power distribution ($AO_P$) using Expression (1), an axial offset of a power distribution capable of providing a current xenon concentration distribution under an equilibrium condition ($AO_X$) using Expression (2), and an axial offset of a power distribution capable of providing a current iodine concentration distribution under an equilibrium condition ($AO_I$) using Expression (3), $$AO_P = (P_T-P_B)/(P_T+P_B) \quad \text{Expression (1).}$$

$$AO_X = (P_{TX}-P_{BX})/(P_{TX}+P_{BX}) \quad \text{Expression (2)}$$

$$AO_I = (P_{TI}-P_{BI})/(P_{TI}+F_{BI}) \quad \text{Expression (3)}$$

Wherein
$P_T$ is a relative power in an upper half of the core,
$P_B$ is a relative power in an lower half of the core,
$P_{TX}$ is a relative power in the upper half of the core capable of providing a current xenon concentration under an equilibrium condition,
$P_{BX}$ is a relative power in the lower half of the core capable of providing a current xenon concentration under an equilibrium condition,
$P_{TI}$ is a relative power in the upper half of the core capable of providing a current iodine concentration under an equilibrium condition, and
$P_{BI}$ is a relative power in the lower half of the core capable of providing a current iodine concentration under an equilibrium condition;
   (b) calculating a parameter $DAO_{PX}$ ($=AO_P-AO_X$) and a parameter $DAO_{IX}$ ($=AO_I-AO_X$);
   (c) displaying a trajectory having a plot point which plots the parameter $DAO_{PX}$ on X axis and the parameter $DAO_{IX}$ on Y axis, whereby the plot point forms an ellipse having a major axis;
   (d) determining if the axial offset of the current power distribution ($AO_P$) exceeds an allowable range;
   (e) setting off alarm when the axial offset of the current power distribution ($AO_P$) exceeds the allowable range and the plot point has deviated from the major axis; and
   (f) moving the control rod after the alarm is set off so that the plot point is guided back to the major axis, whereby the axial power distribution is controlled, and whereby the xenon oscillation is controlled at the same time.

2. A nontransitory computer readable medium having a computer program, which when executed by a computer, causes the computer to perform the method according to claim 1.

3. The method according to claim 1, further comprising in step (f) calculating a distance on the X axis from the deviated plot point to the major axis, calculating a movement volume of the control rod based on the distance, and giving an operation signal of inserting the control rod by the movement volume to a control rod driving mechanism.

4. The method of claim 1, wherein the ellipse has an origin on the major axis, and wherein plot point is guided to the major axis excluding the origin.

5. A system for controlling an axial power distribution in a nuclear reactor having a core and a control rod, comprising:
(a) an axial offset calculation unit that calculates an axial offset of a current power distribution ($AO_P$) using Expression (1), an axial offset of a power distribution capable of providing a current xenon distribution under an equilibrium condition ($AO_X$) using Expression (2), and an axial offset of a power distribution capable of providing a current iodine distribution under an equilibrium condition ($AO_I$) using Expression (3), $$AO_P = (P_T - P_B)/(P_T + P_B) \quad \text{Expression (1)}$$

$$AO_X = (P_{TX} - P_{BX})/(P_{TX} + P_{BX}) \quad \text{Expression (2)}$$

$$AO_I = (P_{TI} - P_{BI})/(P_{TI} + P_{BI}) \quad \text{Expression (3)}$$

Wherein $P_T$ is a relative power in an upper half of the core, $P_B$ is a relative power in an lower half of the core, $P_{TX}$ is a relative power in the upper half of the core capable of providing a current xenon concentration under an equilibrium condition, $P_{BX}$ is a relative power in the lower half of the core capable of providing a current xenon concentration under an equilibrium condition, $P_{TI}$ is a relative power in the upper half of the core capable of providing a current iodine concentration under an equilibrium condition, and $P_{BI}$ is a relative power in the lower half of the core capable of providing a current iodine concentration under an equilibrium condition;

(b) a parameter calculation unit that calculates a parameter $DAO_{PX}$ ($=AO_P - AO_X$) and a parameter $DAO_{IX}$ ($=AO_I - AO_X$);

(c) a trajectory display unit that displays a trajectory having a plot point, wherein the plot point plots the parameter $DAO_{PX}$ on X axis and the parameter ($DAO_{IX}$) on the Y axis, and forms an ellipse having a major axis;

(d) an allowable range excess determination unit that determines if the axial offset of the current power distribution ($AO_P$) exceeds an allowable range;

(e) an alarming unit that sets off alarm when the axial offset of the current power distribution ($AO_P$) exceeds the allowable range and the plot has deviated from the major axis; and (f) a control rod moving unit that moves the control rod after the alarm is set off so that the plot point is guided back to the major axis, whereby the axial power distribution is controlled, and whereby the xenon oscillation is controlled at the same time.

6. The system according to claim 5, characterized in that the control rod moving unit further calculates a distance on the X axis from the deviated plot point to the major axis, calculates a movement volume of the control rod based on the distance, and gives an operation signal of inserting the control rod by the movement volume to a control rod driving mechanism.

7. The system of claim 5, wherein the ellipse has an origin on the major axis, and wherein the plot point is guided to the major axis excluding the origin.

* * * * *